United States Patent [19]

Hansen

[11] Patent Number: 4,730,019

[45] Date of Patent: Mar. 8, 1988

[54] PROCESS FOR PREPARING AN AQUEOUS CUT OF A LIGAND-FREE MONOMER/MALEIC ANHYDRIDE POLYMER AND PRODUCT

[75] Inventor: Frederick C. Hansen, Racine County, Wis.

[73] Assignee: S. C. Johnson & Son, Inc., Racine, Wis.

[21] Appl. No.: 862,084

[22] Filed: May 12, 1986

Related U.S. Application Data

[62] Division of Ser. No. 711,895, Mar. 14, 1985, Pat. No. 4,623,692.

[51] Int. Cl.$^4$ .............................................. C08L 37/00
[52] U.S. Cl. ................................. 524/549; 525/327.4; 525/327.8; 525/370
[58] Field of Search .................. 524/549; 525/327.4, 525/327.8, 370

[56] References Cited

U.S. PATENT DOCUMENTS

| Re. 28,475 | 7/1975 | Blecke et al. | 526/203 |
|---|---|---|---|
| 3,264,272 | 8/1966 | Rees | 525/327.8 |
| 3,308,078 | 3/1967 | Rogers et al. | 524/272 |
| 3,320,196 | 5/1967 | Rogers | 525/370 |
| 3,488,311 | 1/1970 | Burdick et al. | 524/517 |
| 3,553,177 | 1/1971 | Hazen | 526/208 |
| 3,560,455 | 2/1971 | Hazen et al. | 526/272 |
| 3,560,456 | 2/1971 | Hazen et al. | 526/272 |
| 3,560,457 | 2/1971 | Hazen et al. | 526/272 |
| 3,723,375 | 3/1973 | Field et al. | 260/29.6 TA |
| 3,786,012 | 1/1974 | Marion et al. | 525/327.8 |
| 4,243,416 | 1/1981 | Grourke et al. | 524/396 |
| 4,339,370 | 7/1982 | Parker | 525/177 |
| 4,358,573 | 11/1982 | Verbrugge | 526/272 |
| 4,522,992 | 6/1985 | Verbrugge | 524/549 |

FOREIGN PATENT DOCUMENTS 2338642 3/1975 Fed. Rep. of Germany ... 525/327.8

Primary Examiner—Joseph L. Schofer
Assistant Examiner—J. M. Reddick

[57] ABSTRACT

A coating composition having improved heat resistance is disclosed. The coating composition comprises a ligand-free monomer/maleic anhydride polymer, and an effective amount of a metal ion-containing fugitive ligand complex to solubilize the polymer in an aqueous medium.

8 Claims, No Drawings

PROCESS FOR PREPARING AN AQUEOUS CUT OF A LIGAND-FREE MONOMER/MALEIC ANHYDRIDE POLYMER AND PRODUCT

CROSS REFERENCE TO RELATED APPLICATION

This is a division of application Ser. No. 711,895, filed Mar. 14, 1985, now U.S. Pat. No 4,623,692.

BACKGROUND OF THE INVENTION

The invention relates to a process for solubilizing a ligand-free monomer/maleic anhydride polymer, and, more particularly, to a process for forming an aqueous cut of said polymer suitable for processing into a coating film having enhanced heat resistance and to the aqueous cut produced therefrom.

In U.S. Pat. No. 4,358,573, there is disclosed a method for solubilizing a terpolymer of maleic anhydride and mixtures of lower and higher alkenes employing an aqueous solution of ammonium hydroxide. However, films formed from such polymers lack enhanced heat resistance and can become tacky during storage and use.

In the past, zinc ammonium carbonate has been employed as an additive to provide cross-linked emulsion polymer compositions. As illustrated in U.S. Pat. No. 4,339,370, a zinc complex was used to cross-link, but not to dissolve or disperse, a polymer. In U.S. Pat. No. 3,320,196, a zirconium complex was used to disperse certain alkali soluble resins, including rosin/maleic anhydride adducts condensed with polyols. The resulting polymers were employed in removable coating compositions exhibiting enhanced water and detergent resistance in providing high gloss and hardness.

In U.S Pat. No. 3,308,078, a zinc ammonium acetate was employed to aid in dispersing an organic film former of a polyligand emulsion polymer of the styrene-acrylate type.

There has been a continued need for providing resin coatings imparting superior heat resistance to the article to which they are applied. Paper goods such as paper plates and cups employed for hot foods require heat resistant coatings.

Further, in the graphic arts field there exists a need for marking materials containing resin binders, such as inks and paints. Such marking materials, upon application to articles, provide information or decoration. However, until now, marking materials have not provided satisfactory resistance to the application of heat during storage or use.

SUMMARY OF THE INVENTION

It is an object of the invention to provide an aqueous resin cut of a ligand-free monomer/maleic anhydride polymer adapted to be formulated into a resin coating with enhanced heat resistance.

The above and other objects are met in a process for preparing an aqueous resin cut comprising solubilizing in an aqueous medium a ligand-free monomer/maleic anhydride polymer together with a metal fugitive ligand complex, wherein the metal is zinc or zirconium.

Resin cuts made employing a zinc or zirconium metal fugitive ligand complex of the invention have demonstrated superior heat resistant properties, when formulated into a coating film. The zinc or zirconium, it is postulated, acts to cross-link the resin via the carboxyl groups of the hydrolyzed maleic anhydride. The magnitude of enhanced heat resistance imparted to a coating can be on the order of from 50° to 100° F. depending upon the exact composition of the resin. The heat resistance imparted to the coating prepared employing a resin cut of the present invention is especially useful in the graphic arts. Conventionally employed graphic arts acrylic resins are not especially heat resistant and tend to exhibit a blocking or sticking tendency as the temperature rises.

DESCRIPTION OF PREFERRED EMBODIMENTS

In the present process, the polymer which is solubilized is a copolymer, terpolymer or higher interpolymer. Such polymers include maleic anhydride monomer in units alternating between other monomer units.

As employed herein, the phrase "maleic anhydride" includes maleic anhydride monomer and other maleic derivative anhydrides, such as methylmaleic anhydride, dimethyl maleic anhydride, fluoromaleic anhydride, methylethyl maleic anhydride, or the hydrolyzed form of the above, and the like. It is preferred that the anhydride is substantially free of acid and the like, before polymerization. The preferred anhydride is maleic anhydride.

As employed herein the phrase "ligand-free monomer" includes one or more comonomers which are polymerizable, ethylenically unsaturated monomers. Typical such comonomers include alpha-olefins, aromatic alkenyl monomers, acrylate monomers, methacrylate monomers and the like.

Typical aromatic alkenyl monomers include vinyl toluene, alpha-methylstyrene and styrene.

Typical acrylate and methacrylate monomers are disclosed in U.S. Pat. No. 3,308,078 issued March 7, 1967, to J. R. Rogers, et al. The disclosure of that patent, especially in columns 9 and 10 thereof, is expressly incorporated herein with regard to ligand-free monomers. As set forth therein the ligand-free monomers include alkyl acrylates and methacrylates.

The preferred comonomers which are polymerizable with maleic anhydride are the 1-olefins also known as alpha-olefins. Copolymers and terpolymers of maleic anhydride and 1-olefins are especially suitable for forming the heat resistant coatings of the present invention. Maleic anhydrides/alpha olefin copolymers are well known to the art as illustrated in U.S. Pat. Nos. 3,553,177; 3,560,455; 3,560,456; 3,560,457 and 3,488,311.

The most preferred ligand-free monomer(s)/maleic anhydride polymers solubilized by the process of the invention are terpolymers of maleic anhydride, a lower 1-alkene and a higher 1-alkene containing from about 49 to 60 mole percent maleic anhydride, 10 to 40 mole percent of a lower 1-alkene and 40–10 mole percent of a higher 1-alkene having 18 or more carbon atoms in its carbon chain. Such terpolymers are disclosed in U.S. Pat. No. 4,358,573 issued Nov. 9, 1982, and U.S. application, Ser. No. 508,697 now U.S. Pat. No. 4,522,992, filed June 28, 1983 the disclosures of which are expressly incorporated herein.

The preferred terpolymers generally have a number average molecular weight from about 3,000 to 5,000 and may be prepared by polymerization processes as set forth in U.S. Pat. No. 3,553,177, U.S. Pat. No. Re 28,475 and 3,560,455.

Although the resin cuts can be prepared with any concentration of resin present, it is preferred that from about 15 to 35% by weight of the resins be present in the aqueous cuts of the present invention. The resin cuts could contain from about 5 to 50% by weight of resin.

To solubilize the polymers of the present invention a metal fugitive ligand complex is employed. The metal ion of the complex is a zinc or zirconium ion. The fugitive ligand is ammonia, which readily converts to a volatile gas. To complete the complex, an anion, such as formate, acetate, bicarbonate or, preferably, carbonate, is utilized.

The anion can also be fugitive, such as carbonate or formate, which readily converts to a volatile gas, such as carbon dioxide.

Suitable zinc and zirconium fugitive ligand complexes are disclosed in U.S. Pat. Nos. 3,303,078 and 3,320,196. The preferred metal complexes are zirconium ammonium carbonate and zinc ammonium carbonate.

In general, the metal fugitive ligand complexes are prepared by adding aqueous ammonia to aqueous solutions of zinc or zirconium salts. If desired, zinc or zirconium oxides, which are not water soluble, can be dissolved in solutions of ammonium carbonate, ammonium bicarbonate, ammonium formate or the like in the presence of ammonia.

In general, the concentration of metal fugitive ligand complex in the aqueous cut is expressed as a ratio of moles of metal fugitive ligand complex to the equivalents of such carboxyl groups present in the polymer of the invention to be solubilized. The ratio of metal ions to carboxyl group is preferably from about 0.075 to about 0.50.

Typically, the resin cut is prepared by admixing a metal fugitive ligand complex of the invention with the desired polymer in an aqueous solution with stirring and at an elevated temperature until the dispersion is complete. If desired, the polymer of the invention may be neutralized, usually up to no greater than about 40% of the resin carboxyl groups, with a non-fugitive alkaline substance, such as sodium hydroxide. Although any effective amount of a metal fugitive ligand complex can be used, it is preferred to include about 3 to 20% by weight of metal fugitive ligand complex based on the weight of the final resin solution. It is most preferred to include 10 to 17% by weight of metal fugitive ligand complex.

In general, when a coating composition is formulated from the resin cut, the metal fugitive ligand complex usually comprises from about 0.30 to about 3.0% of the coating composition.

In general, the metal fugitive ligand complex is added in sufficient amounts to provide a solution pH from about 7 to 9. The liquid medium is preferably water.

The following examples illustrate certain preferred embodiments of the invention and are not limited of scope.

EXAMPLE I

Styrene $C_{18}$ alpha olefin/maleic anhydride terpolymer of the invention having a molar ratio of 0.6/0.4/1 was prepared and solubilized employing zinc ammonium carbonate as follows: The alpha olefin terpolymer was charged to a suitable vessel followed by the water and the zinc ammonium carbonate solution. This mixture was heated to 170°–180° F. (76° C.–82° C.) with good agitation and held at that temperature for 30 minutes or until all the resin was in solution. The solution was cooled to ambient temperature with agitation and transferred to a separate vessel for use. The resin cut had the following composition:

| INGREDIENTS | PARTS |
|---|---|
| Terpolymer | 20 |
| Zinc ammonium carbonate solution (15%) | 15 |
| Water | 65 |

The resin cut was formulated into a coating as follows: The resin cut can be formulated into a coating in various ways. It can be used as is or to obtain additional water resistance; it can be combined with an acrylic emulsion at levels of 0–100% wet weight.

When this coating was compared to one employing the same terpolymer but solubilized with ammonium hydroxide, it was found that the increased heat resistance was on the order of 50°–100° F. when the composition was tested as follows: The various coatings were tested by making draw downs on different paper stocks at coating weights of 0.2 to 0.8 MIL dry film thickness. The coatings were allowed to dry for a minimum of 16 hours before testing. The heat resistant tests were conducted on a Sentinel Heat Sealer under 30 psi pressure with a dwell time of 3 seconds. The samples were tested coated surface to coated surface and coated surface to foil. Failure was noted when the coated stock blocked (adhered so fiber tear or surface delamination occurred).

EXAMPLE II

A resin cut was prepared as in Example I by solubilizing 25 parts of the terpolymer of Example I, 10 parts zinc ammonium carbonate solution, 5 parts ammonium hydroxide in 60 parts water.

The resin cut thus prepared had a pH of 7.9 and a Brookfield viscosity of 425 cps. The resin cut was used as a coating as is and tested in the same manner as the coating of Example I. The properties of that coating were as follows:

60° gloss meter readings —47° –49°

Maximum block temperature—coated surface to coated surface—450° F.

Maximum block temperature—coated surface to foil—550° F.

EXAMPLE III

Two terpolymers of styrene/$C_{18}$ alpha olefin/maleic anhydride having mole ratios of: (a)0.5/0.5/1.0 and (b)0.4/0.6/1.0 were prepared and cut using the procedure of Example I.

Where these terpolymers were tested for heat resistance using the procedure of Example I and had maximum blocking temperatures as shown below.

| Run | Coating/Coating | Coating/Foil |
|---|---|---|
| a | 450° F. | 550° F. |
| b | 425° F. | 500° F. |

What is claimed is:

1. A coating composition having improved heat resistance, the coating composition comprising a ligand-free monomer maleic anhydride polymer that is able to be solubilized in an aqueous medium, and an effective amount of a metal ion-containing fugitive ligand complex to solubilize the polymer in the aqueous medium, said aqueous medium having a pH of from 7 to 9, wherein the ligand-free monomer is a polymerizable, ethylenically unsaturated monomer selected from the group consisting of alpha-olefin, aromatic alkenyl monomer, acrylate monomer, methacrylate monomer, and combinations thereof, wherein the metal ion of the metal ion-containing fugitive ligand complex is a zinc or zirconium ion, and wherein the fugitive ligand is ammonia.

2. The composition of claim 1 wherein the polymer is present in an amount of about 5 to 50% by weight.

3. The composition of claim 1 wherein the polymer is a lower 1-alkene, a higher 1-alkene and maleic anhydride terpolymer.

4. The composition of claim 1 wherein the complex is a metal ammonium carbonate selected from the group consisting of zinc ammonium carbonate and zirconium ammonium carbonate.

5. The composiition of claim 1 wherein the polymer is an alpha olefin, styrene, maleic anhydride terpolymer.

6. The composition of claim 1 wherein the metal fugitive ligand complex is present in said composition in an amount of from about 0.30 to about 3.0% by weight of the coating composition.

7. The coating composition in accordance with claim 1, wherein the complex includes an anion selected from the group consisting of formate, acetate, bicarbonate, and carbonate.

8. The coating composition in accordance with claim 7 wherein the anion is carbonate.

* * * * *